(12) United States Patent
Liu et al.

(10) Patent No.: US 11,252,603 B2
(45) Date of Patent: Feb. 15, 2022

(54) RETRANSMISSION SCHEMES BASED ON LLR COMBINING IN WLAN

(71) Applicant: MediaTek Singapore Pte. Ltd., Solaris (SG)

(72) Inventors: Jianhan Liu, San Jose, CA (US); Yongho Seok, San Jose, CA (US); Chung-Ta Ku, San Jose, CA (US); Thomas Edward Pare, Jr., San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 49 days.

(21) Appl. No.: 16/570,518

(22) Filed: Sep. 13, 2019

(65) Prior Publication Data
US 2020/0112878 A1  Apr. 9, 2020

Related U.S. Application Data

(60) Provisional application No. 62/743,010, filed on Oct. 9, 2018.

(51) Int. Cl.
| | | |
|---|---|---|
| *H04W 28/04* | (2009.01) | |
| *H04L 1/16* | (2006.01) | |
| *H04L 1/18* | (2006.01) | |
| *H04W 80/02* | (2009.01) | |
| *H04W 84/12* | (2009.01) | |

(52) U.S. Cl.
CPC .......... *H04W 28/04* (2013.01); *H04L 1/1614* (2013.01); *H04L 1/1812* (2013.01); *H04L 1/1845* (2013.01); *H04W 80/02* (2013.01); *H04W 84/12* (2013.01)

(58) Field of Classification Search
CPC ...... H04W 28/04; H04W 80/02; H04W 84/12; H04L 1/1614; H04L 1/1812; H04L 1/1845
USPC .......................................... 370/216
See application file for complete search history.

(56) References Cited

U.S. PATENT DOCUMENTS

| | | | |
|---|---|---|---|
| 2016/0380727 A1 | 12/2016 | Ryu et al. | |
| 2017/0126363 A1* | 5/2017 | Wang | H04L 1/1671 |
| 2017/0150493 A1* | 5/2017 | Seok | H04B 7/0452 |
| 2017/0195912 A1* | 7/2017 | Tujkovic | H04B 7/0617 |
| 2017/0230149 A1 | 8/2017 | Wang et al. | |
| 2018/0063849 A1* | 3/2018 | Mohammed | H04L 43/16 |
| 2019/0149362 A1* | 5/2019 | Jalloul | H04L 25/0256 |
| | | | 375/341 |
| 2020/0052832 A1* | 2/2020 | Tian | H04L 1/1812 |
| 2020/0107325 A1* | 4/2020 | Zhang | H04L 25/03866 |
| 2021/0203450 A1* | 7/2021 | Xu | H04L 1/1819 |

* cited by examiner

*Primary Examiner* — Christopher R Crompton

(57) ABSTRACT

Embodiments of the present invention provide a method and apparatus for enhanced data retransmission based on log-likelihood ratio (LLR) combining in WLAN. According to some embodiments, packets can be retransmitted using a modified transmission scheme. Packets that are received with an error are stored, and a subsequent packet is received that includes data that can be used to correct the error. For example, each packet can be encoded for both error detection and correction, and the retransmission mechanism can be adapted to the error rate. The retransmission scheme is improved by utilizing an LLR combining scheme, transmit diversity, and modified ACK methods.

20 Claims, 13 Drawing Sheets

RETRANSMISSION SCHEMES BASED ON LLR COMBINING IN WLAN

CROSS-REFERENCE TO RELATED APPLICATIONS

This application claims the benefit of and priority to provisional patent application Ser. No. 62/743,010, with a filing date of Oct. 9, 2018, which is hereby incorporated by reference in its entirety.

FIELD

Embodiments of the present invention generally relate to the field of wireless communications. More specifically, embodiments of the present invention relate to systems and methods for efficiently managing retransmission of data in a wireless network.

BACKGROUND

Modern electronic devices typically send and receive data with other electronic devices wirelessly using Wi-Fi, and often data that is sent by a transmitter to a receiver is lost or corrupted. This can be due to interference from other electronic device, or other common issues with wireless transmission of data, such as weather or obstructions that physically block the wireless signal. For these reasons, several techniques for retransmitting data have been developed so that data intended for the receiver can be delivered successfully, even if retransmission is required.

Two common techniques for retransmitting data are Automatic Repeat Request (ARQ) and Forward Error Coding (FEC). ARQ is a technique that requires the receiver to send an acknowledgement ("ACK") packet when data has been received successfully. If the data is not delivered successfully or delivered with an error, no ACK is sent to the transmitter. In this case, when the transmitter does not receive an ACK, the data is retransmitted. While this approach leads to very high reliability when transmitting data, sending an ACK for every data packet that is successfully received leads to decreased throughput when errors occur frequently in the channel.

FEC is a technique that allows a receiver to correct errors in the transmission using error coding and metadata. For instance, data can be sent with a cyclic redundancy check (CRC) digest. FEC reduces errors and only moderately decreases throughput. However, the use of FEC does not lead to high reliability, as some errors may not be able to be corrected using the error coding.

Hybrid automatic repeat request (hybrid ARQ or HARQ) combines high-rate forward error-correcting coding and ARQ error-control. In standard ARQ, redundant bits are added to data to be transmitted based on an error-detecting (ED) code such as a CRC as referred to above. Receivers detecting a corrupted message request a new message from the sender, the original data is encoded with a forward error correction (FEC) code, and the parity bits are sent along with the message or transmitted upon request when a receiver detects an error. Hybrid ARQ performs better than ordinary ARQ in poor signal conditions, but in its simplest form this comes at the expense of significantly lower throughput in good signal conditions.

What is needed is an approach to data retransmission that provides high reliability without significantly reducing the throughput for transmitting data between a transmitter and a receiver in a wireless network.

SUMMARY

Accordingly, embodiments of the present invention provide a method and apparatus for enhanced data retransmission in a wireless network based on log-likelihood ratio (LLR) combining in WLAN. According to some embodiments, packets can be retransmitted using a modified transmission scheme. Packets that are received with an error are stored, and a subsequent packet is received that includes data that can be used in combination with the stored data to correct the error. For example, each packet can be encoded for both error detection and correction, and the retransmission mechanism can be adapted to the error rate. The retransmission scheme is improved by utilizing an LLR combining scheme, transmit diversity, and modified ACK methods.

According to one embodiment, a method of data retransmission in a wireless network. The method includes transmitting a wireless packet including an aggregated MAC Protocol Data Unit (AMPDU) including a plurality of MAC Protocol Data Units (MPDUs) and codewords associated with the MPDUs, receiving an acknowledgement from a receiver indicating failed MPDUs of the AMPDU that were received with error, where the receiver stores log-likelihood ratios (LLRs) for a set of codewords associated with the failed MPDUs, and responsive to the acknowledgement, retransmitting the retransmitted set of codewords to the receiver, where the receiver combines the set of codewords with the codewords associated with the MPDUs using the stored LLRs to generate combined codewords, where the receiver decodes the combined codewords to generate decoded codewords, and where the receiver resolves the MPDUs of the AMPDU using the decoded codewords.

According to some embodiments, the codewords associated with the MPDUs and the retransmitted set of codewords include LDCP codewords, and where the wireless network is a WiFi network.

According to some embodiments, the transmitting a wireless packet including an AMPDU includes using a first transmit diversity scheme, and where the retransmitting the set of codewords includes using the first transmit diversity scheme.

According to some embodiments, the transmitting a wireless packet including an AMPDU includes using a first transmit diversity scheme, and where the retransmitting the set of codewords includes using a second transmit diversity scheme.

According to some embodiments, retransmitting the set of codewords includes retransmitting a minimum set of codewords that contain the failed MPDUs.

According to some embodiments, the acknowledgement is a block acknowledgment (BA), and the method includes identifying the minimum set of codewords required to be retransmitted based on an index of the BA.

According to some embodiments, the MPDUs are segmented and where each codeword is associated with a respective single MPDU.

According to a different embodiment, a method of data retransmission in a wireless network is disclosed. The method includes receiving a wireless aggregated MAC Protocol Data Unit (AMPDU) including a plurality of MAC Protocol Data Units (MPDUs) and codewords associated with the MPDUs from a transmitter of the wireless network, transmitting a wireless acknowledgement to the transmitter indicating failed MPDUs of the AMPDU that were received with error, storing log-likelihood ratios (LLRs) in memory for a set of codewords associated with the failed MPDUs, receiving a wirelessly retransmitted set of codewords over the wireless network, combining the retransmitted set of codewords with the codewords associated with the MPDUs using the stored LLRs to generate combined codewords, decoding the combined codewords to generate decoded data, and resolving the MPDUs of the AMPDU using the decoded data.

According to another embodiment, a system for data retransmission in a wireless network is disclosed. The system includes a wireless transmitter and a wireless receiver. The transmitter is operable to transmit an aggregated MAC Protocol Data Unit (AMPDU) including a plurality of MAC Protocol Data Units (MPDUs) and codewords associated with the MPDUs to the receiver, the receiver is operable to transmit a codeword acknowledgement (CA) to the transmitter, where the CA indicates failed codewords of the AMPDU that were received with error to the transmitter, the receiver is operable to store log-likelihood ratios (LLRs) in memory for the failed codewords, the transmitter is operable to retransmit the failed codewords to the receiver, the receiver is operable to combine the retransmitted failed codewords with the failed codewords associated with the AMPDU using the stored LLRs to generate combined codewords, the receiver is operable to decode the combined codewords to generate decoded data, and the receiver is operable to resolve the MPDUs of the AMPDU using the decoded data.

According to some embodiments, the codewords and the retransmitted failed codewords include LDCP codewords, and where the wireless network is a WiFi wireless network.

According to some embodiments, the AMPDU is transmitted by the transmitter using a first transmit diversity scheme, and where the failed codewords are retransmitted by the transmitter using the first transmit diversity scheme.

According to some embodiments, the first transmit diversity scheme includes at least one of: frequency diversity, and spatial diversity.

According to some embodiments, where the AMPDU is transmitted by the transmitter using a first transmit diversity scheme, where the failed codewords are retransmitted by the transmitter using a second transmit diversity scheme, and where the first and second transmit diversity schemes are different.

According to some embodiments, the first transmit diversity scheme and the second transmit diversity scheme include transmitting data using at least one of: different frequency segments, different tone interweavers, different spatial streams, different beamforming techniques, and different quadrature amplitude modulation.

According to some embodiments, the transmitter is operable to retransmit the failed codewords to the receiver using an enacted retransmission packet including a PHY header, and where the PHY header includes a SIG field indicating a modulation scheme used to retransmit the failed codewords.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
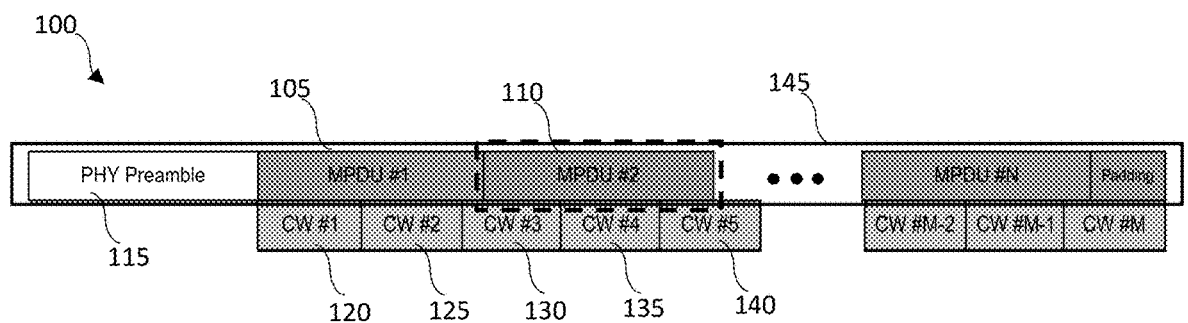
FIG. 1 is a block diagram showing wireless data packets transmitted in an exemplary re-transmission scheme for communications between a transmitter and a receiver in a wireless network depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 3B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Retransmission Schemes Based on LLR Combining in WLAN

Embodiments of the present invention provide a method and apparatus for enhanced data retransmission based on log-likelihood ratio (LLR) combining in WLAN. According to some embodiments, wireless data packets can be retransmitted to a receiver station using a modified transmission scheme. Packets that are received with an error are stored by the receiver, and a subsequent packet is retransmitted and received that includes data that can be used to correct the error. For example, each packet can be encoded for both error detection and correction, and the retransmission mechanism can be adapted to the error rate. The retransmission scheme is improved by utilizing an LLR combining scheme, transmit diversity, and modified ACK methods. These are further described below.

LLR combining is also known as Chase Combining and involves a receiver combining multiple received copies of a coded packet. Transmit diversity is applied on re-transmission in certain embodiments to improve signal reception. According to some embodiments of the present invention, a transmitter transmits an aggregated MAC protocol data unit (AMPDU), and the receiver responds with a block acknowledgement (BA) indicating which Mac protocol data units (MPDUs) of the AMPDU have not been received successfully. A BA is a packet that includes multiple acknowledgements, for example, represented by a bitmap indicating which packets or portions have been received successfully.

The transmitter retransmits the missed MPDUs using various transmit diversity schemes. The transmit diversity schemes can include frequency diversity, spatial diversity, or a combination of both. In one example of transmit diversity, the retransmitted symbols can be mapped on different frequency segments to use different tone interleavers. In another example of transmit diversity, the retransmit symbols can be mapped on different spatial streams, e.g., a different antennae, or using different beam forming techniques. The transmit diversity scheme can also include different modulation mapping to introduce extra coding gain. For example, a different quadrature amplitude modulation (QAM) mapping can be used to change the reliability of different coded bits. By retransmitting packets using transmit diversity, the chances that the retransmitted packet is received successfully are increased. One or more of the transmit diversity schemes described above can be used on subsequent retransmissions.

With regard to FIG. 1, a block diagram 100 showing wireless packets transmitted in an exemplary re-transmission scheme for communications between a transmitter and a receiver is depicted according to embodiments of the present invention. PHY Preamble 115 includes information indicating how to decode LDPC codewords included in the transmission. The LDCP codewords (CW) are not aligned with the MPDUs in this example, and therefore some codewords, e.g., CW #3 130, may be associated with two MPDUs. The transmission may include any N number of MPDUs contained in AMPDU 145, and any M number of codewords associated with the MPDUs. The payload of the retransmitted packets include the same encoded bits as the missed codewords from the previous transmission. The codewords can be decoded by the receiver and combined with codewords of retransmitted packets using stored LLR values from the original transmission to resolve the missing MPDUs.

MPDU #1 105 is associated with codewords CW #1 120, CW #2 125, and CW #3 130. MPDU #2 110 is associated with codewords CW #3 130, CW #4 135, and CW #5 140. In the example of FIG. 1, MPDU #1 105 is assumed to be received successfully by the receiver in the original transmission, and MPDU #2 110 is not received successfully. In this case, the receiver stores the LLRs for codewords CW #3 130, CW #4 135, and CW #5 140 associated with MPDU #2 110. The receiver stores the received data and sends a BA to the transmitter. The BA includes an MPDU index and indicates that MPDU #1 105 was received successfully and that MPDU #2 110 was not received successfully. For example, the BA can include a bitmap representing an acknowledgment bit for each of the MPDUs transmitted successfully (or not) in the original transmission.

After receiving the BA, the transmitter identifies codewords CW #3 130, CW #4 135, and CW #5 140 associated with MPDU #2 110 from the MPDU index in the BA. The transmitter then responsive to the BA retransmits the minimum set of codewords CW #3 130, CW #4 135, and CW #5 140. According to some embodiments, the transmitter retransmits the minimum set of codewords CW #3 130, CW #4 135, and CW #5 140 using a different transmit diversity scheme from the original transmission. The receiver then combines the retransmitted codewords CW #3 130, CW #4 135, and CW #5 140 with the codewords from the original transmission using the stored LLR values to decode the codewords. The MPDU #2 110 is resolved from the decoded data.

Figure 2:
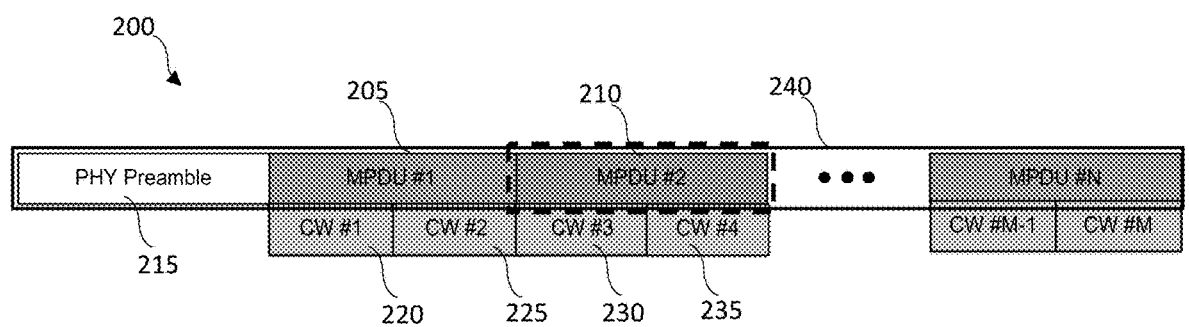
FIG. 2 is a block diagram showing segmented wireless data packets transmitted in an exemplary re-transmission scheme for communications between a transmitter and a receiver depicted according to embodiments of the present invention.

With regard to FIG. 2, a block diagram 200 showing wireless packets transmitted in an exemplary re-transmission scheme for communications between a transmitter and a receiver using BAs and segmentation is depicted according to embodiments of the present invention. PHY Preamble 215 includes information indicating how to decode LDPC codewords included in the transmission. In this example, the LDCP codewords are segmented to align with the MPDUs, and therefore the codewords are always associated with exactly one MPDU. The transmission may include any N number of MPDUs contained in AMPDU 240, and any M number of codewords associated with the MPDUs. The payload of the retransmitted packets include the same encoded bits as the missed codewords from the previous transmission. The codewords can be decoded by the receiver, stored, and combined with codewords of retransmitted packets using stored LLR values from the original transmission to resolve the missing MPDUs.

In one embodiment, the MPDUs can be aligned with the codewords by adding padding to the codewords at the transmitter. For example, the MPDUs may be delimited without having a fixed size, and the MAC header includes information regarding the delimiters. The transmitter adds limited padding to the codewords to generate aligned coding block for more efficient retransmission.

MPDU #1 205 is associated with codewords CW #1 220, CW #2 225, and MPDU #2 210 is associated with codewords CW #3 230 and CW #4 235. In the example of FIG. 2, MPDU #1 205 is assumed to be received successfully by the receiver in the original transmission, and MPDU #2 210 is not received successfully. In this case, the receiver stores the LLRs for codewords CW #3 230 and CW #4 235 associated with MPDU #2 210. The receiver sends a BA to the transmitter. The BA includes an MPDU index and indicates that MPDU #1 205 was received successfully and that MPDU #2 210 was not received successfully. For example, the BA can include a bitmap representing an acknowledgment bit of each of the MPDUs transmitted successfully (or not) in the original transmission.

After receiving the BA, the transmitter identifies codewords CW #3 230 and CW #4 235 associated with MPDU #2 210 from the MPDU index in the BA. The transmitter retransmits the minimum set of codewords CW #3 230 and CW #4 235. According to some embodiments, the transmitter retransmits the minimum set of codewords CW #3 230 and CW #4 235 using a different transmit diversity scheme from the original transmission. The receiver then combines the retransmitted codewords CW #3 230 and CW #4 235 with the codewords stored from the original transmission using the stored LLR values to decode the codewords. The MPDU #2 210 is resolved from the decoded data.

Figure 3A:
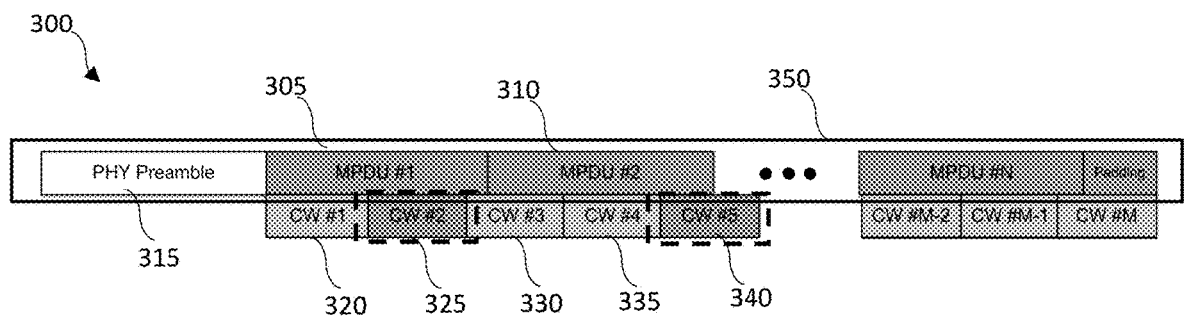
FIG. 3A is a block diagram showing wireless data packets transmitted in an exemplary re-transmission scheme using codeword acknowledgement (CA) for communications between a transmitter and a receiver depicted according to embodiments of the present invention.

With regard to FIG. 3A, a block diagram 300 showing wireless packets transmitted in an exemplary re-transmission scheme for communications between a transmitter and a receiver in a wireless network where the scheme uses codeword acknowledgment (CA) is depicted according to embodiments of the present invention. Using CAs to acknowledge received codewords requires that each codeword contains its own cyclic redundancy check (CRC) so that the receiver can detect if the codeword is received without error. The receiver can respond to the transmitter with CAs to indicate which specific codewords were not delivered successfully in the original transmission. The CA may contain a respective bit for each codeword to indicate successful receipt or not of the codeword.

PHY Preamble 315 includes information indicating how to decode LDPC codewords included in the transmission. The LDCP codewords are not aligned with the MPDUs in this example, and therefore some codewords, e.g., CW #3 330, may be associated with two MPDUs. The transmission may include any N number of MPDUs contained in AMPDU 350, and any M number of codewords associated with the MPDUs. The payloads of the retransmitted packets include the same encoded bits as the missed codewords from the previous transmission. The codewords can be decoded by the receiver and combined with codewords of retransmitted packets using stored LLR values from the original transmission to resolve the missing MPDUs.

MPDU #1 305 is associated with codewords CW #1 320, CW #2 325, and CW #3 330, and MPDU #2 310 is associated with codewords CW #3 330, CW #4 335, and CW #5 340. In the example of FIG. 3A, CW #2 325 and CW #5 340 are assumed to not be received successfully by the receiver in the original transmission. In this case, the receiver stores the LLRs for codewords CW #2 325 and CW #5 340. The receiver sends a CA to the transmitter indicating that CW #2 325 and CW #5 340 were not delivered successfully to the receiver. The transmitter in response to the CA then identifies CW #2 325 and CW #5 340 from the CA and re-transmits CW #2 325 and CW #5 340. According to some embodiments, the transmitter retransmits CW #2 325 and CW #5 340 using a different transmit diversity scheme from the original transmission. The receiver then combines the retransmitted codewords CW #2 325 and CW #5 340 with the codewords from the original transmission using the stored LLR values to decode the codewords. The MPDU #1 305 and MPDU #2 310 are resolved from the decoded data.

Figure 3B:
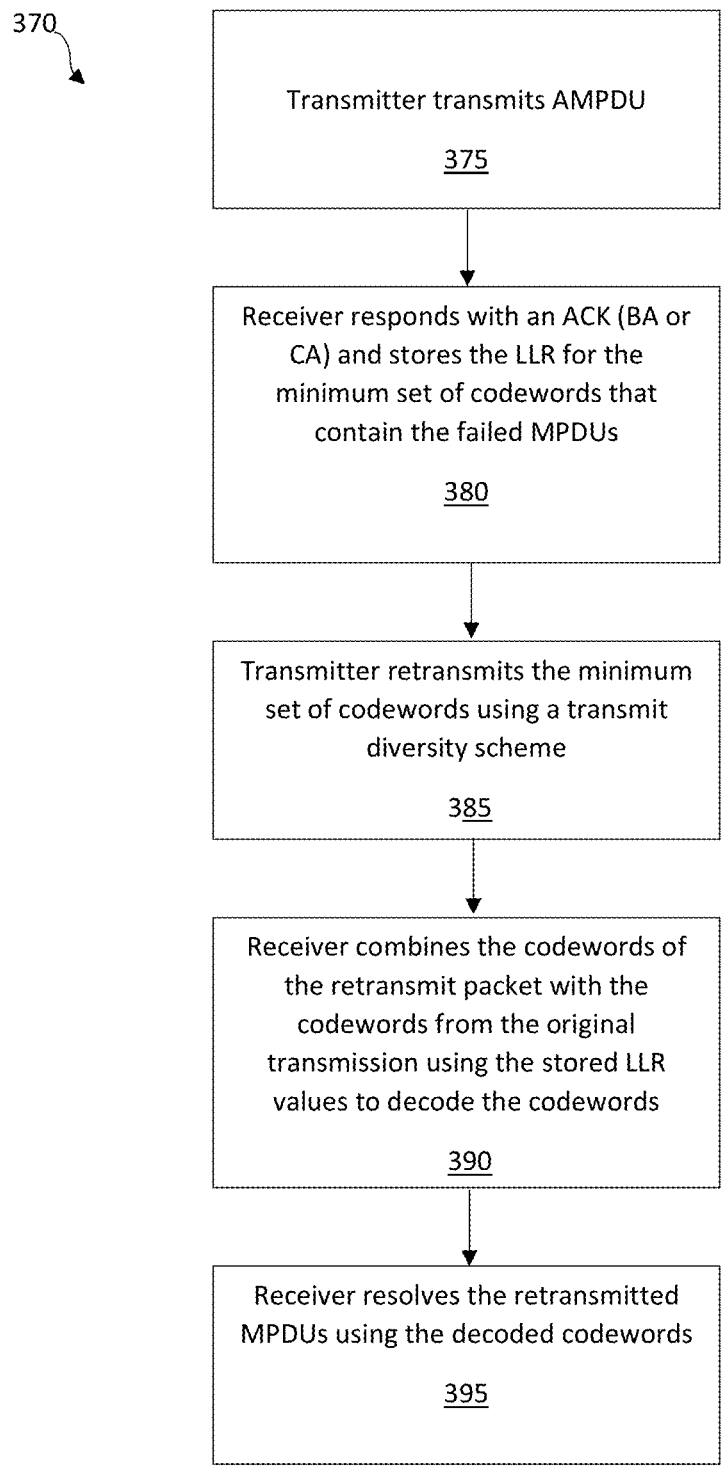
FIG. 3B is a flowchart of an exemplary re-transmission scheme for a wireless network depicted according to embodiments of the present invention.

With regard to FIG. 3B, a flowchart of an exemplary wireless re-transmission scheme 370 is depicted according to embodiments of the present invention. The re-transmission scheme 370 includes performing chase combining at the receiver by retransmitting a minimum set of LDPC codewords.

At step 375, the transmitter transmits an AMPDU to the receiver station.

At step 380, the receiver responds with an ACK (e.g., a BA or CA) indicating which MPDUs or codewords have not been received successfully. The receiver also stores the LLR in memory for the minimum set of LDPC codewords that contain the failed MPDUs. The minimum set of LDPC codewords that contains an MPDU or a group of MPDUs are pre-determined by the transmitter and the receiver and are stored at the receiver.

At step 385, the transmitter retransmits the minimum set of LDPC codewords using a transmit diversity scheme. The re-transmission and transmit diversity scheme is indicated in the retransmit packet. The transmitter can identify the minimum set of LDPC codewords that need to be retransmitted based on the failed MPDU index included in the BA or CA. According to some embodiments, the transmitter retransmits the minimum set of LDPC codewords using a different transmit diversity scheme from the previous transmission to the receiver station over the wireless network.

At step 390, the receiver combines the codewords of the retransmit packet with the LDPC codewords from the original transmission using the stored LLR values to decode the codewords.

At step 395, the receiver resolves the retransmitted MPDUs using the decoded LDPC codewords.

Figure 4:
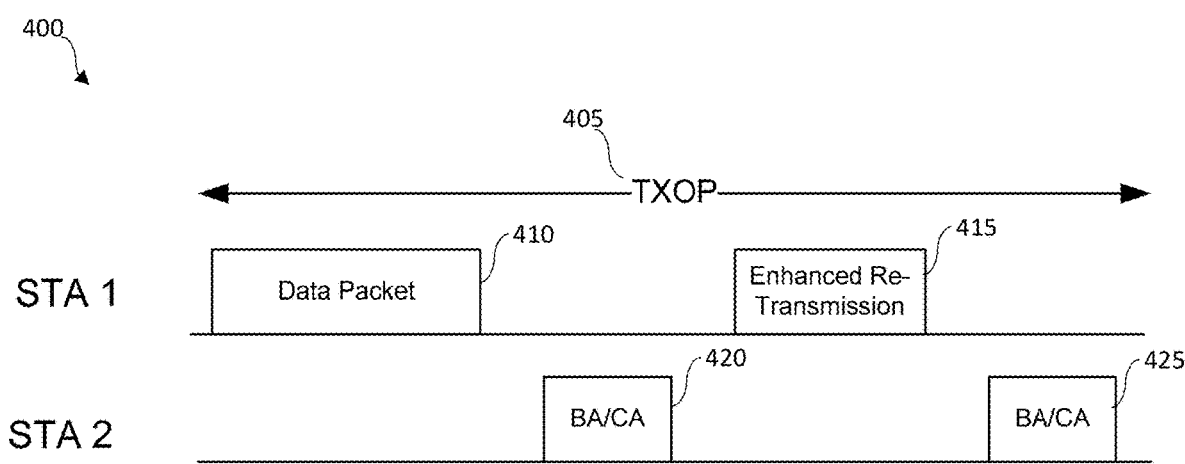
FIG. 4 is a block diagram of operations and procedures for implementing an enhanced retransmission scheme for a wireless network depicted according to embodiments of the present invention.

With regard to FIG. 4, a block diagram of operations and procedures 400 for implementing an enhanced retransmission scheme is depicted according to embodiments of the present invention. The enhanced retransmission scheme can be performed within a single transmission opportunity (TXPO) 405 to reduce the amount of data stored in the buffers of the transmitter and receiver and to reduce protocol complexity. The TXOP 405 is a defined interval of time of the wireless network during which a particular quality-of-service QoS station (STA) has the right to initiate frame exchange sequences into the wireless medium.

In the example of FIG. 4, a data packet 410 is transmitted from transmitter STA1 to receiver STA2. STA2 sends an ACK (BA or CA) 420 indicating which MPDUs or LDPC codewords were not received successfully. An enhanced re-transmission packet 415 is transmitted by STA1 and the receiver can combine the original data packet 410 with the retransmitted data packet 415 using LLRs stored from the original transmission. The enhanced re-transmission packet 415 can be delivered using a different transmit diversity scheme. The STA2 then sends another ACK (BA or CA) 425 indicating if the enhanced re-transmission packet 415 was successfully received. If the TXOP 405 expires before the enhanced re-transmission packet 415 is successfully delivered, the receiver STA2 abandons the stored LLR for data packet 410. STA1 can then start the process over and retransmit data packet 410 during the next TXOP.

Figure 5:
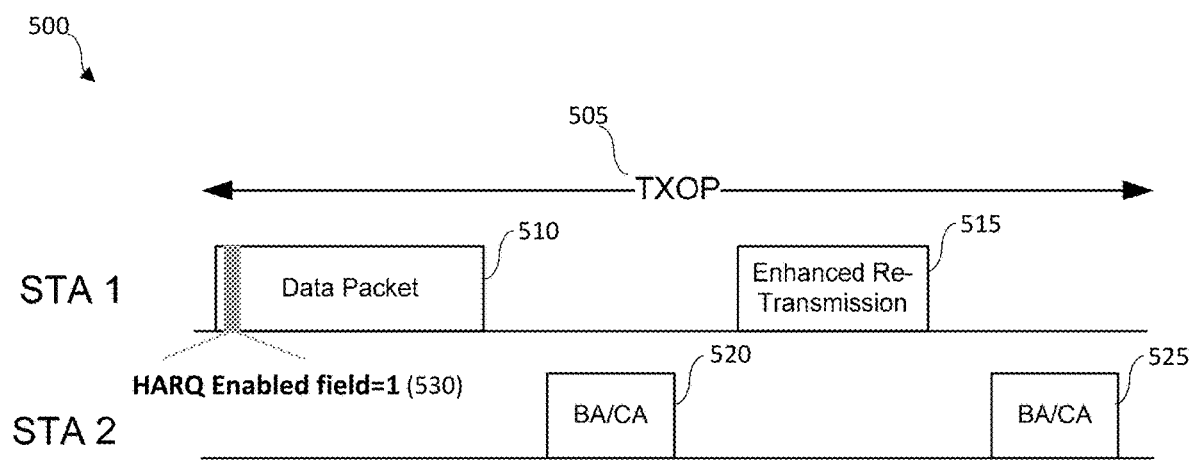
FIG. 5 is a block diagram of operations and procedures for implementing an enhanced retransmission scheme using a wireless data packet having a PHY header or MAC header that includes a HARQ Enable field depicted according to embodiments of the present invention.

With regard to FIG. 5, a block diagram of operations and procedures 500 for implementing an enhanced retransmission scheme is depicted according to embodiments of the present invention. The enhanced retransmission scheme can be performed within a single transmission opportunity (TXOP) 505 to reduce the amount of data stored in the buffers of the transmitter and receiver and to reduce protocol complexity. The TXOP 505 is a defined interval of time during which a particular quality-of-service QoS station (STA) has the right to initiate frame exchange sequences into the wireless medium.

In the example of FIG. 5, a data packet 510 is transmitted from transmitter STA1 to receiver STA2. The data packet 510 has a PHY header or MAC header that includes a HARQ Enable field 530 in this example indicating whether the enhanced re-transmission scheme is applied. For example, if the data packet 510 does not need any extra reliability, or a traditional ARQ is enough (because the BER is enough low), the HARQ Enabled field 530 in the header is set to 0. This indicates that the enhanced re-transmission schemes will not be used for error recovery of the Data packet. Therefore, the transmitter will not request the codewords from the receivers. Otherwise, the HARQ Enabled field 530 in the header is set to 1. This indicates that the enhanced re-transmission schemes will be used for error recovery of the data packet. In this case, the receiver prepares the codewords for error recovery, and the transmitter can request the codewords from the receivers.

In the example of FIG. 5, the HARQ Enabled field 530 in the header is set to 1. Therefore, STA2 sends an ACK (BA or CA) 520 indicating which MPDUs or LDPC codewords were not received successfully. An enhanced re-transmission packet 515 is transmitted by STA1 and the receiver can combine the original data packet 510 with the retransmitted data packet 515 using LLRs stored from the original transmission. The enhanced re-transmission packet 515 can be transmitted using a different transmit diversity scheme. The STA2 then sends another ACK (BA or CA) 525 indicating if the data was successfully received by the enhanced re-transmission method 515. If the TXOP 505 expires before the enhanced re-transmission packet 515 is successfully delivered, the receiver STA2 abandons the stored LLR for data packet 510. STA1 can then start the process over and retransmit data packet 510 during the next TXOP.

Figure 6:
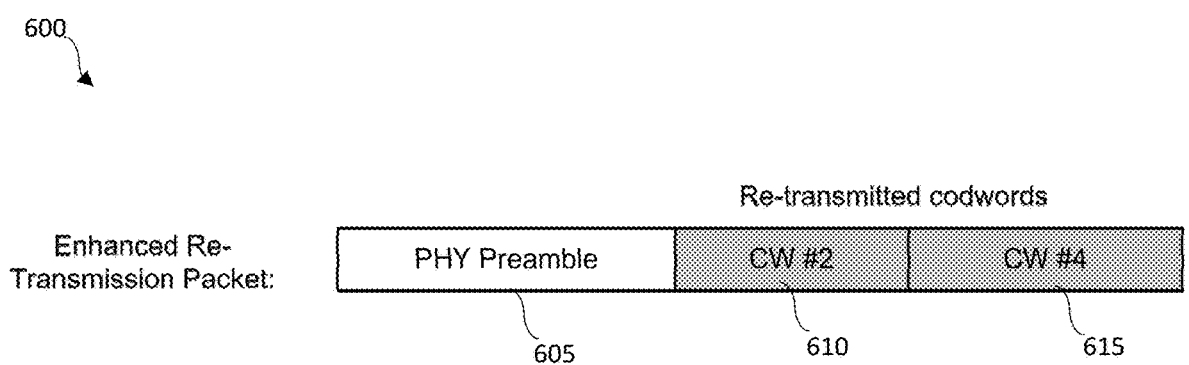
FIG. 6 is a block diagram of an exemplary format of an enhanced retransmission packet for a wireless network depicted according to embodiments of the present invention.

The enhanced retransmission wireless packet transmitted in an enhanced retransmission scheme can be formatted in different ways according to embodiments of the present invention. In a first format depicted in FIG. 6, the enhanced retransmission packet 600 does not include a MAC header. In this case, the packet is retransmitted with the missing codewords 610 and 615 and a modified PHY preamble 605.

Figure 7:
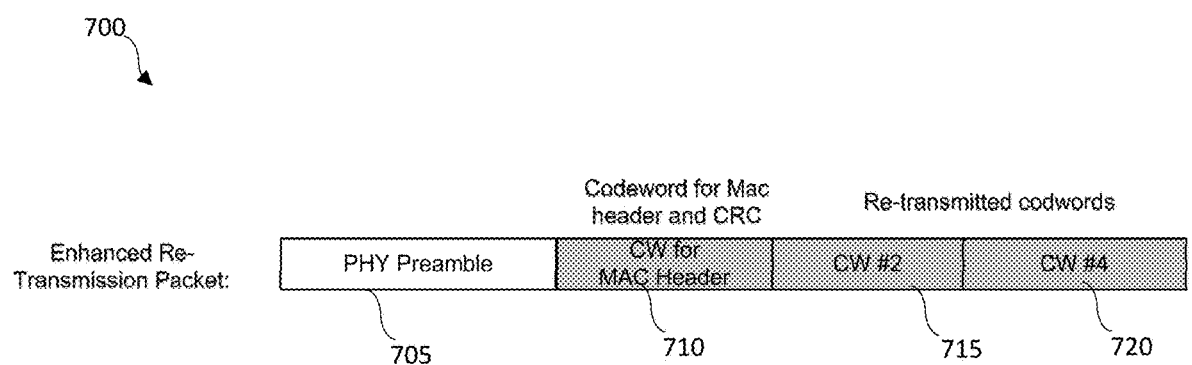
FIG. 7 is a block diagram of an exemplary format of an enhanced retransmission packet for a wireless network, the packet including a MAC header depicted according to embodiments of the present invention.

In a second format depicted in FIG. 7, the enhanced retransmission wireless packet 700 includes a MAC header with a separate CRC encoded independently from the re-transmitted codewords 715 and 720. To improve reliability, the codeword 710 for the MAC head and the CRC can be transmitted using a different modulation and coding scheme from the re-transmitted codewords 715 and 720. The modulation scheme for the codeword 710 of the MAC header and CRC and the modulation scheme for the re-transmitted codewords 715 and 720 are signaled in a SIG field of PHY preamble 705. The re-transmitted codewords are appended to the MAC header.

Figure 8A:
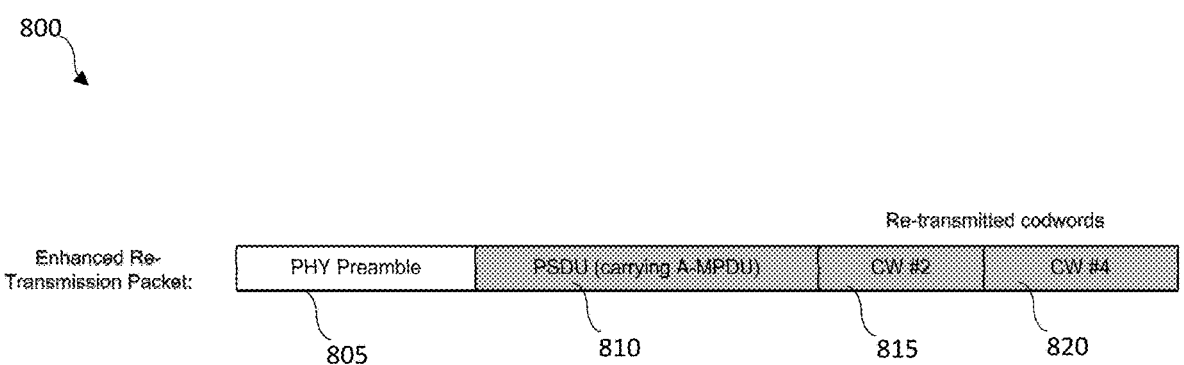
FIG. 8A is a block diagram of an exemplary format of an enhanced retransmission packet including codewords appended to a PSDU depicted according to embodiments of the present invention for a wireless network.

In a third format depicted in FIG. 8A, the enhanced retransmission wireless packet 800 includes retransmitted codewords appended/prepended to another packet. For example, the retransmitted codeword can be appended to a PLCP Service Data Unit (PSDU) 810 that carries a new data frame. The signaling for the PSDU is included in a SIG field of PHY preamble 805 and a MAC header included in the PSDU 810. The signaling for the retransmitted codewords 815 and 820 can be included in the SIG field of the PHY preamble 805 or in the MAC header of the PSDU 810. The PSDU 810 and the retransmitted codewords 815 and 820 can be independently transmitted.

Figure 8B:
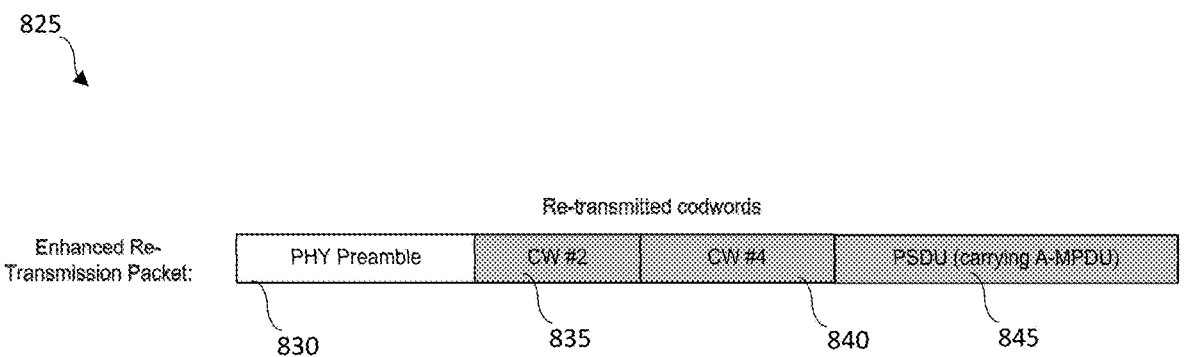
FIG. 8B is a block diagram of an exemplary format of an enhanced retransmission packet including codewords prepended to a PSDU depicted according to embodiments of the present invention for a wireless network.

As depicted in FIG. 8B, the enhanced retransmission wireless packet 825 can include retransmitted codewords appended/prepend to the PSDU 845 that carries the AMPDU. Using the format depicted in FIG. 8B can reduce the amount of buffer required at the receiver. The signaling for the retransmitted codewords is contained in the SIG field of the PHY preamble 830. The SIG field in the PHY preamble 830 indicates the retransmitted codewords 835 and 840.

Figure 9A:
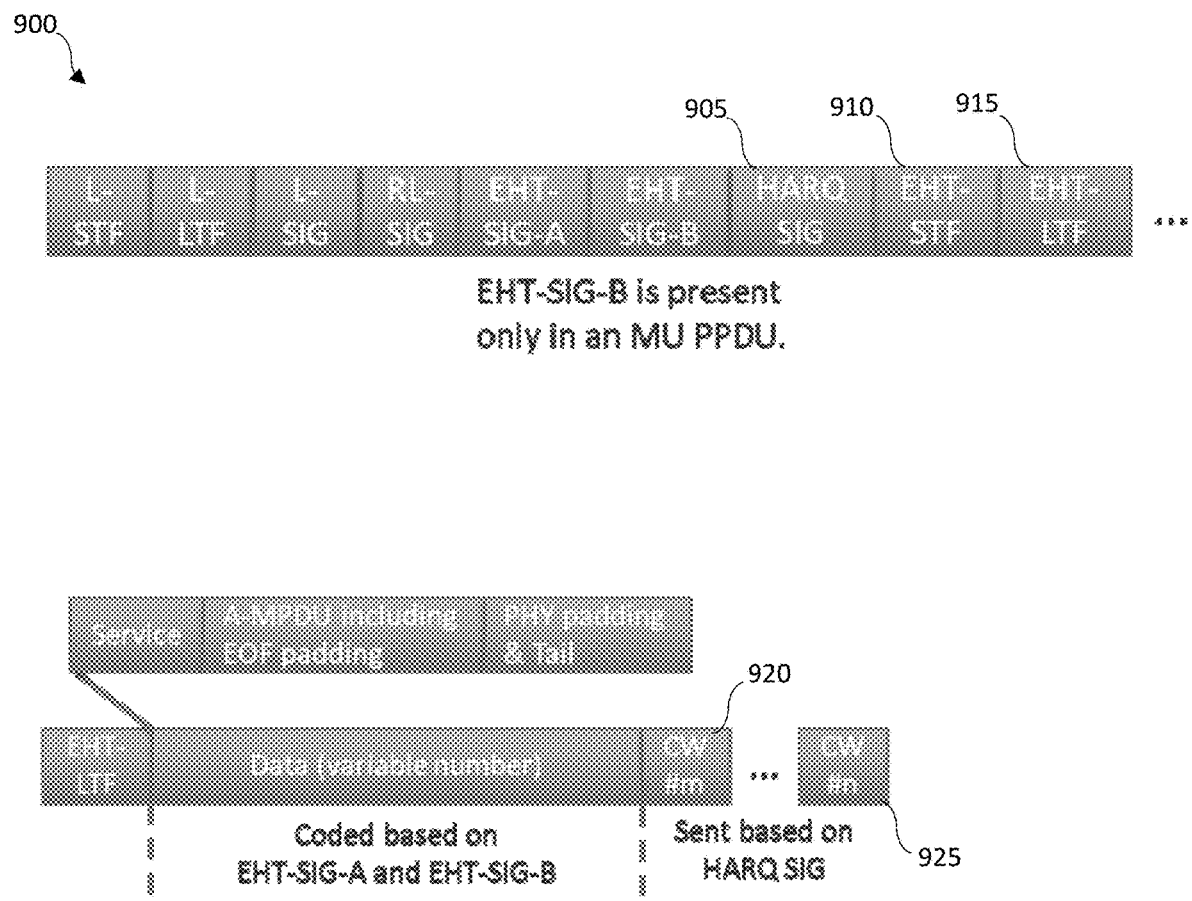
FIG. 9A is a block diagram of an exemplary PPDU including a HARQ SIG field depicted according to embodiments of the present invention.

According to some embodiments, a signal field of a PPDU 900 is used to indicate HARQ details for performing forward error-correcting coding and ARQ error-control. For example, as depicted in FIG. 9A, a HARQ SIG field 905 can contain signaling information for retransmission, such as codeword index, station ID, and the modulating and coding scheme. The HARQ SIG field is located before EHT-STF field 910 and EHT-LTF field 915. The codewords 920 and 925 are transmitted based on the information contained in the HARQ SIG field 905.

According to some embodiments, HARQ SIG field 905 is located after EHT-STF field 910 and EHT-LTF field 915.

Figure 9B:
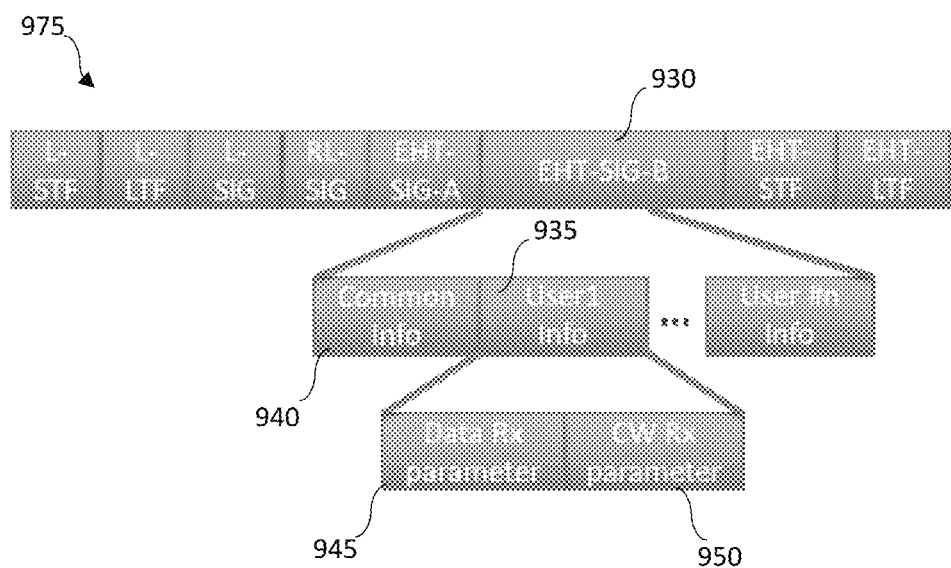
FIG. 9B is a block diagram of an exemplary MU PPDU including a HARQ SIG field depicted according to embodiments of the present invention.

As depicted in FIG. 9B, according to some embodiments of the present invention, in a multi-user (MU) PLCP Protocol Data Unit (PPDU) 975, each User Info field in the EHT-SIG-B 930 can carry the HARQ information for the corresponding user. For example, as depicted in FIG. 9B, the EHT-SIG-B 930 includes information common to all users in Common Info field 940, information associated with specific users, e.g., User1 Info 935. The user information includes data rx parameters 945 and codeword rx parameters 950.

Exemplary Computer Controlled System

Embodiments of the present invention are drawn to electronic systems for enhanced data retransmission based on LLR combining in WLAN. According to some embodiments, wireless data packets can be retransmitted using a modified transmission scheme. Packets that are received with an error are stored, and a subsequent packet is received that includes data that can be used to correct the error. The following discussion describes one such exemplary electronic system or computer system can be used as a platform for implementing embodiments of the present invention as a receiver station and/or a transmitter station.

Figure 10:
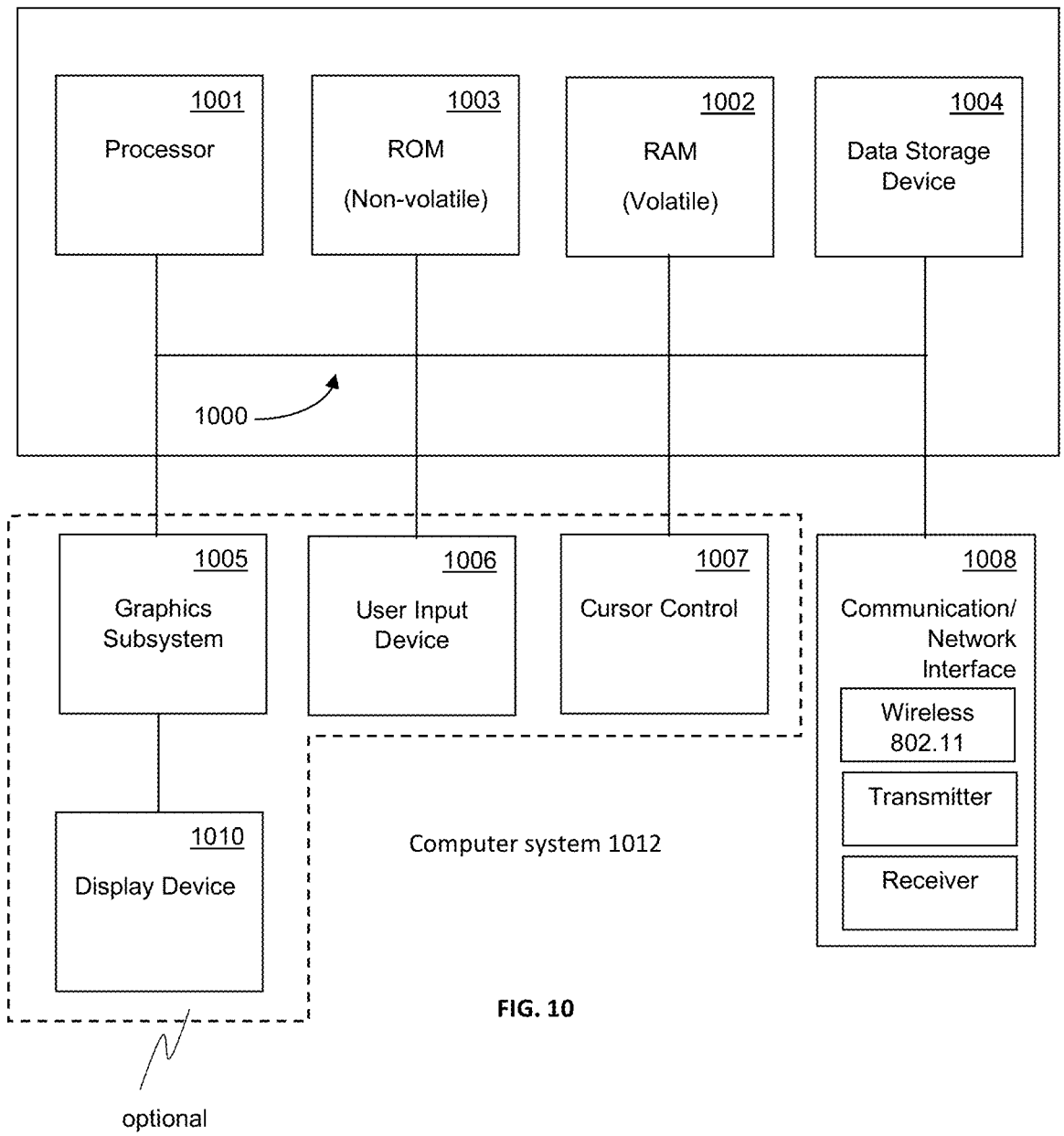
FIG. 10 is a block diagram of an exemplary computer system upon which embodiments of the present invention may be implemented.

In the example of FIG. 10, the exemplary computer system 1012 (e.g., a wireless access point or a wireless station) includes a central processing unit (CPU) 1001 for running software applications and optionally an operating system. Random access memory 1002 and read-only memory 1003 store applications and data for use by the CPU 1001. Data storage device 1004 provides non-volatile storage for applications and data and may include fixed disk drives, removable disk drives, flash memory devices, and CD-ROM, DVD-ROM or other optical storage devices. The optional user inputs 1006 and 1007 comprise devices that communicate inputs from one or more users to the computer system 1012 (e.g., mice, joysticks, cameras, touch screens, and/or microphones).

A communication or network interface 1008 includes a plurality of transceivers and allows the computer system 1012 to communicate with other computer systems, networks, or devices via an electronic communications network, including wired and/or wireless communication and including an Intranet or the Internet (e.g., 802.11 wireless standard). The communication or network interface 1008 and can include a transmitter and a separate receiver for sending and receiving wireless data.

The optional display device 1010 may be any device capable of displaying visual information in response to a signal from the computer system 1012 and may include a flat panel touch sensitive display, for example. The components of the computer system 1012, including the CPU 1001, memory 1002/1003, data storage 1004, user input devices 1006, and graphics subsystem 1005 may be coupled via one or more data buses 1000.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of data retransmission in a wireless network, the method comprising:

transmitting a wireless packet comprising an aggregated MAC Protocol Data Unit (AMPDU) comprising a plurality of MAC Protocol Data Units (MPDUs) and codewords associated with the MPDUs;

receiving an acknowledgement from a receiver indicating failed MPDUs of the AMPDU that were received with error, wherein the receiver stores log-likelihood ratios (LLRs) for a set of codewords associated with the failed MPDUs; and responsive to the acknowledgement, transmitting a set of codewords to the receiver for performing chase combining to resolve the MPDUs of the AMPDU in a retransmission packet comprising a SIG field signaling a modulation scheme for transmitting the codewords, wherein the receiver chase combines the set of codewords with the codewords associated with the MPDUs using the stored LLRs to generate combined codewords, decodes the combined codewords to generate decoded codewords, and resolves the MPDUs of the AMPDU using the decoded codewords.

2. The method as described in claim 1, wherein the codewords associated with the MPDUs and the set of codewords comprise LDCP codewords, and the wireless network is a WiFi network.

3. The method as described in claim 1, wherein the transmitting a wireless packet comprising an AMPDU comprises using a first spatial stream, and the transmitting the set of codewords comprises using a second spatial stream.

4. The method as described in claim 1, wherein the transmitting a wireless packet comprising an AMPDU comprises using a first beamforming technique, and the transmitting the set of codewords comprises using a second beamforming technique.

5. The method as described in claim 1, wherein retransmitting the set of codewords comprises retransmitting a minimum set of codewords that contain the failed MPDUs.

6. The method as described in claim 5, wherein the acknowledgement is a block acknowledgment (BA), and further comprising identifying the minimum set of codewords required to be retransmitted based on an index of the BA.

7. The method as described in claim 1, wherein the MPDUs are segmented and each codeword is associated with a respective single MPDU.

8. A method of data retransmission in a wireless network, the method comprising:

receiving a wireless aggregated MAC Protocol Data Unit (AMPDU) comprising a plurality of MAC Protocol Data Units (MPDUs) and codewords associated with the MPDUs from a transmitter of the wireless network;

transmitting a wireless acknowledgement to the transmitter indicating failed MPDUs of the AMPDU that were received with error;

storing log-likelihood ratios (LLRs) in memory for a set of codewords associated with the failed MPDUs;

receiving a wirelessly retransmitted set of codewords over the wireless network for performing chase combining to resolve the MPDUs of the AMPDU in a retransmission packet comprising a SIG field signaling a modulation scheme used to transmit the codewords;

chase combining the retransmitted set of codewords with the codewords associated with the MPDUs using the stored LLRs to generate combined codewords;

decoding the combined codewords to generate decoded data; and resolving the MPDUs of the AMPDU using the decoded data.

9. The method as described in claim 8, wherein the codewords and the retransmitted set of codewords comprise LDCP codewords, and the wireless network is a WiFi wireless network.

10. The method as described in claim 8, wherein the AMPDU is transmitted by the transmitter using a first spatial stream, and the retransmitted set of codewords is transmitted by the transmitter using a second spatial stream.

11. The method as described in claim 8, wherein the AMPDU is transmitted by the transmitter using a first beamforming technique, and the retransmitted set of codewords is transmitted by the transmitter using a second beamforming technique.

12. The method as described in claim 8, wherein the retransmitted set of codewords comprises a minimum set of codewords that contain the failed MPDUs.

13. The method as described in claim 12, wherein the acknowledgement is a block acknowledgment (BA) comprising a respective bit for each MPDU of said AMPDU, and the minimum set of codewords required to be retransmitted is determined by the transmitter based on an index of the BA.

14. A system for data retransmission in a wireless network, the system comprising:
   a wireless transmitter; and
   a wireless receiver, wherein:
      the transmitter is operable to transmit an aggregated MAC Protocol Data Unit (AMPDU) comprising a plurality of MAC Protocol Data Units (MPDUs) and codewords associated with the MPDUs to the receiver;
      the receiver is operable to transmit a codeword acknowledgement (CA) to the transmitter, wherein the CA indicates failed codewords of the AMPDU that were received with error to the transmitter;
      the receiver is operable to store log-likelihood ratios (LLRs) in memory for the failed codewords;
      the transmitter is operable to retransmit codewords to the receiver for performing chase combining to resolve the MPDUs of the AMPDU in a retransmission packet comprising a SIG field signaling a modulation scheme for retransmitted codewords;
      the receiver is operable to chase combine the retransmitted codewords with the failed codewords of the AMPDU using the stored LLRs to generate combined codewords;
      the receiver is operable to decode the combined codewords to generate decoded data; and
      the receiver is operable to resolve the MPDUs of the AMPDU using the decoded data.

15. The system as described in claim 14, wherein the failed codewords and the retransmitted codewords comprise LDCP codewords, and the wireless network is a WiFi wireless network.

16. The system as described in claim 14, wherein the AMPDU is transmitted by the transmitter using a first spatial stream, and the failed codewords are retransmitted by the transmitter using a second spatial stream.

17. The system as described in claim 16, wherein the AMPDU is transmitted by the transmitter using a first set of frequency segments, and the failed codewords are transmitted by the transmitter using a second set of frequency segments.

18. The system as described in claim 14, wherein the AMPDU is transmitted by the transmitter using a first transmit quadrature amplitude modulation (QAM) mapping, and the failed codewords are retransmitted by the transmitter using a second QAM mapping.

19. The system as described in claim 14, wherein the AMPDU is transmitted by the transmitter using a first tone interleaver, and the failed codewords are transmitted by the transmitter using a second tone interleaver.

20. The system as described in claim 14, wherein the retransmission packet comprises an enacted retransmission packet comprising a PHY header, and the PHY header comprises the SIG field.

* * * * *